United States Patent
Taniguchi et al.

(10) Patent No.: US 11,594,737 B2
(45) Date of Patent: Feb. 28, 2023

(54) MEMBRANE ELECTRODE ASSEMBLY WITH A CATALYST LAYER INCLUDING AN INORGANIC OXIDE CATALYST CARRIER AND A HIGHLY HYDROPHOBIC SUBSTANCE AND SOLID POLYMER FUEL CELL USING THE ASSEMBLY

(71) Applicants: Mitsui Mining & Smelting Co., Ltd., Tokyo (JP); University of Yamanashi, Yamanashi (JP)

(72) Inventors: Koji Taniguchi, Saitama (JP); Masahiro Watanabe, Yamanashi (JP); Makoto Uchida, Yamanashi (JP); Katsuyoshi Kakinuma, Yamanashi (JP)

(73) Assignees: MITSUI MINING & SMELTING CO., LTD., Tokyo (JP); UNIVERSITY OF YAMANASHI, Yamanashi (JP)

( * ) Notice: Subject to any disclaimer, the term of this patent is extended or adjusted under 35 U.S.C. 154(b) by 350 days.

(21) Appl. No.: 16/434,031

(22) Filed: Jun. 6, 2019

(65) Prior Publication Data
US 2019/0288297 A1 Sep. 19, 2019

Related U.S. Application Data

(62) Division of application No. 15/300,075, filed as application No. PCT/JP2015/056522 on Mar. 5, 2015, now Pat. No. 10,355,285.

(30) Foreign Application Priority Data

Mar. 31, 2014 (JP) ................................ 2014-072538

(51) Int. Cl.
| H01M 8/10 | (2016.01) |
| H01M 4/86 | (2006.01) |
| H01M 8/1004 | (2016.01) |
| H01M 4/90 | (2006.01) |
| H01M 4/92 | (2006.01) |

(52) U.S. Cl.
CPC ....... *H01M 4/8663* (2013.01); *H01M 4/8605* (2013.01); *H01M 4/9075* (2013.01); *H01M 4/925* (2013.01); *H01M 8/1004* (2013.01); *H01M 2008/1095* (2013.01); *H01M 2300/0082* (2013.01)

(58) Field of Classification Search
CPC ............ H01M 4/8663; H01M 4/8668; H01M 4/8673; H01M 4/8605; H01M 4/9075; H01M 4/925; H01M 8/1004; H01M 2008/1095; H01M 2300/0082
See application file for complete search history.

(56) References Cited

U.S. PATENT DOCUMENTS

| 7,429,428 | B2 | 9/2008 | Watakabe | |
| 7,871,740 | B2 | 1/2011 | Tamura et al. | |
| 7,947,411 | B1 | 5/2011 | Morioka et al. | |
| 7,981,571 | B2 | 7/2011 | Tsuji et al. | |
| 7,998,638 | B2 | 8/2011 | Kim et al. | |
| 8,398,884 | B2 * | 3/2013 | Masao | B22F 7/08 252/182.1 |
| 10,355,285 | B2 * | 7/2019 | Taniguchi | H01M 4/9075 |
| 2004/0038808 | A1 | 2/2004 | Hampden-Smith et al. | |
| 2004/0121220 | A1 | 6/2004 | Ikoma | |
| 2005/0214631 | A1 | 9/2005 | Hirashige | |
| 2005/0266291 | A1 | 12/2005 | Watakabe | |
| 2006/0105227 | A1 | 5/2006 | Kim et al. | |
| 2008/0075996 | A1 | 3/2008 | Tsuji et al. | |
| 2010/0248071 | A1 * | 9/2010 | Konishi | H01M 4/926 429/483 |
| 2011/0020727 | A1 * | 1/2011 | Burlatsky | H01M 8/1004 429/483 |
| 2015/0086901 | A1 * | 3/2015 | Tatsuno | H01M 4/8605 429/481 |
| 2015/0118594 | A1 * | 4/2015 | Liu | H01M 8/1048 429/480 |
| 2015/0352522 | A1 | 12/2015 | Mizuuchi et al. | |

FOREIGN PATENT DOCUMENTS

| CN | 1777962 | 5/2006 |
| CN | 1985392 | 6/2007 |
| CN | 100487964 | 5/2009 |
| CN | 101816088 | 8/2010 |
| EP | 1655795 | 5/2006 |
| JP | 2004171847 A | 6/2004 |
| JP | 2004-185901 | 7/2004 |
| JP | 2005-276746 | 10/2005 |
| JP | 2006-310201 | 11/2006 |
| JP | 2008-34300 | 2/2008 |
| JP | 2008-541399 | 11/2008 |

(Continued)

OTHER PUBLICATIONS

International Search Report, PCT/JP2015/056522, dated May 19, 2015 (Cited in parent application.).
Supplementary European Search Report dated Aug. 25, 2017 in corresponding European Patent Application No. 15772241.4 (Cited in parent application.).

*Primary Examiner* — Raymond Alejandro
(74) *Attorney, Agent, or Firm* — Nixon & Vanderhye

(57) ABSTRACT

A membrane-electrode assembly including a catalyst layer that includes a catalyst-supporting carrier in which a catalyst is supported on a carrier made of an inorganic oxide, and a highly hydrophobic substance having a higher degree of hydrophobicity than the inorganic oxide, the catalyst layer being formed on at least one surface of a polymer electrolyte membrane. It is preferable that, in the membrane-electrode assembly, the degree of hydrophobicity of the highly hydrophobic substance is from 0.5 vol % to 45 vol % at 25° C., the degree of hydrophobicity being defined as a concentration of methanol (vol %) when a light transmittance of a dispersion obtained by dispersing the highly hydrophobic substance in a mixed solution of water and methanol reaches 80%.

9 Claims, 3 Drawing Sheets

(56) References Cited

FOREIGN PATENT DOCUMENTS

| | | |
|---|---|---|
| JP | 2009099486 A | 5/2009 |
| JP | 2010-92814 | 4/2010 |
| JP | 2011-175772 | 9/2011 |
| WO | WO 2014129597 | 8/2014 |

* cited by examiner

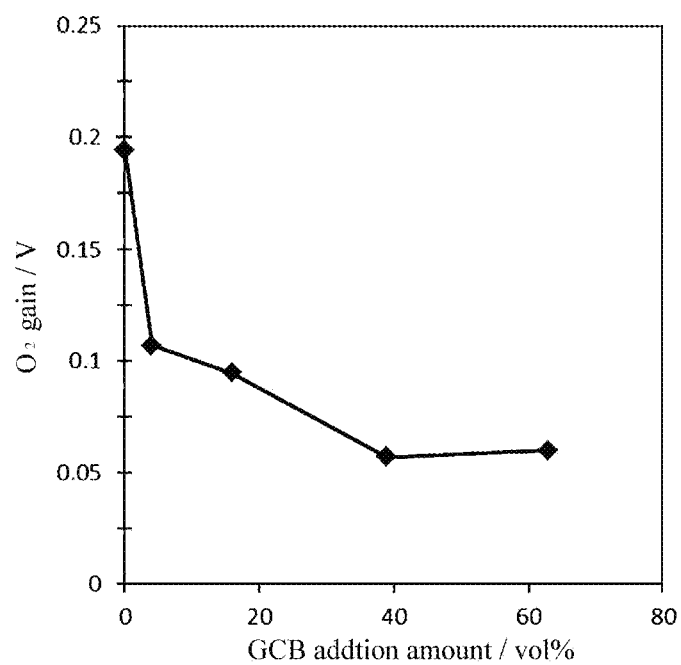

MEMBRANE ELECTRODE ASSEMBLY WITH A CATALYST LAYER INCLUDING AN INORGANIC OXIDE CATALYST CARRIER AND A HIGHLY HYDROPHOBIC SUBSTANCE AND SOLID POLYMER FUEL CELL USING THE ASSEMBLY

CROSS-REFERENCE TO RELATED APPLICATION

This application is a division of U.S. patent application Ser. No. 15/300,075, now U.S. Pat. No. 10,355,285, which was the U.S. national stage of International application PCT/JP2015/056522, filed Mar. 5, 2015.

TECHNICAL FIELD

The present invention relates to a membrane-electrode assembly and a polymer electrolyte fuel cell using the membrane-electrode assembly.

BACKGROUND ART

A polymer electrolyte fuel cell has a structure in which catalyst layers are arranged on respective surfaces of a polymer electrolyte membrane, and a gas diffusion layer is arranged on the outer side of each catalyst layer. In general, the catalyst layer is a porous layer made of a catalyst-supporting carrier in which a noble metal catalyst is supported on the surface of carrier particles. A fuel gas such as hydrogen or methanol, or an oxidant such as oxygen or air, circulates through the porous layer, and an electrode reaction occurs at the three-phase interface, producing water within the catalyst layer.

The produced water dissipates from the catalyst layer, but in some cases, the water accumulates within the catalyst layer. If this progresses, the catalyst layer will not be able to hold the water therein, giving rise to a phenomenon called flooding. With the aim of preventing flooding, Patent Literature 1 proposes to provide a cathode catalyst layer of a fuel cell with sections for reducing oxygen and sections having a higher water repellency than the oxygen-reducing sections. When the surface of the cathode catalyst layer is observed, the highly water-repellent sections are distributed unevenly.

The fuel cell disclosed in Patent Literature 1 employs a carbon material as a catalyst carrier. In cases where, for example, a fuel cell is used so as to be activated and stopped repeatedly in a short time, carbon materials are known to oxidize and corrode during voltage fluctuation or during the stoppage of supplied gas. With the aim of overcoming this drawback of carbon materials, proposals have been made to use materials other than carbon materials, such as metal oxides, as the catalyst carrier.

The surface of a metal oxide, however, has high wettability to water, which makes flooding more likely compared to carbon materials. Patent Literature 2 provides a carrier made of an inorganic substance with water repellency by causing a water-repellent surface protection substance to be adsorbed on the carrier surface. Examples of the water-repellent surface protection substance include long-chain organic acids such as stearic acid, silica-based materials, and fluorine-based materials.

CITATION LIST

Patent Literature

Patent Literature 1: JP 2004-171847A
Patent Literature 2: JP 2009-099486A

SUMMARY OF INVENTION

The technique disclosed in Patent Literature 2 provides a carrier with water repellency, which helps to prevent flooding. Providing water repellency to a carrier, however, tends to affect the catalyst substances supported on the carrier.

An objective of the invention is to provide a membrane-electrode assembly and a polymer electrolyte fuel cell capable of overcoming the various drawbacks of the aforementioned conventional art.

The present invention provides a membrane-electrode assembly including a catalyst layer that includes a catalyst-supporting carrier in which a catalyst is supported on a carrier made of an inorganic oxide, and a highly hydrophobic substance having a higher degree of hydrophobicity than the inorganic oxide, the catalyst layer being formed on at least one surface of a polymer electrolyte membrane.

BRIEF DESCRIPTION OF DRAWINGS

FIG. 5 is a graph illustrating the relationship between $O_2$ gain and the amount of highly hydrophobic substance added in each of the polymer electrolyte fuel cells obtained in Examples 1 and 5 to 7 and Comparative Example 2.

DESCRIPTION OF EMBODIMENTS

Figure 1:
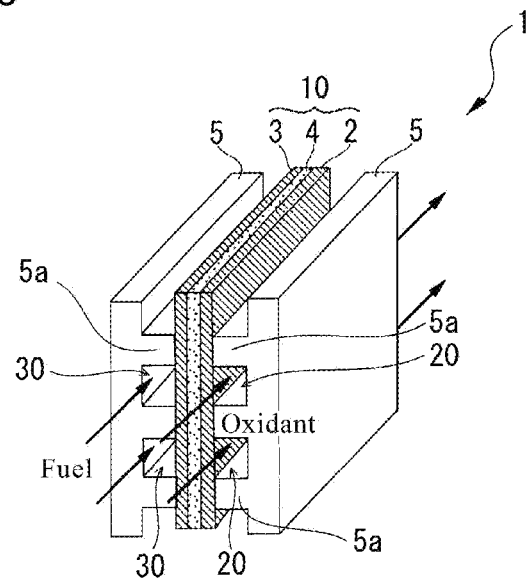
FIG. 1 is a perspective view illustrating an embodiment of the invention.

The present invention is described below according to preferred embodiments thereof with reference to the drawings. FIG. 1 illustrates an embodiment of the present invention. A polymer electrolyte fuel cell 1 illustrated in FIG. 1 includes a membrane-electrode assembly 10. The membrane-electrode assembly 10 is constituted by arranging a cathode 2 and an anode 3 on respective surfaces of a polymer electrolyte membrane 4. The fuel cell 1 further includes a pair of separators 5, 5 sandwiching the membrane-electrode assembly 10. This structure constitutes a unit cell.

As illustrated in FIG. 1, the cathode 2, the anode 3, and the electrolyte membrane 4 have the same shape, such as a rectangular shape, and have substantially the same size. As illustrated in FIG. 1, the separators 5 are bipolar separators as referred to in the art, and each separator has, on the surface opposing the membrane-electrode assembly 10, a plurality of rib-shaped projections 5a extending along one direction. The rib-shaped projections 5a are arranged with intervals therebetween, and the intervals are substantially even. On the surface of the separator 5 opposing the cathode 2 of the membrane-electrode assembly 10, the spaces between adjacent projections 5a constitute oxidant supplying sections 20 for supplying an oxidant to the cathode 2. On the other hand, on the surface of the separator 5 opposing the anode 3 of the membrane-electrode assembly 10, the spaces between adjacent projections 5a constitute fuel gas supplying sections 30 for supplying fuel to the anode 3.

The cathode 2 has: a catalyst layer (not illustrated) that is located adjacent to one surface of the electrolyte membrane 4; and a gas diffusion layer (not illustrated) that is located adjacent to the catalyst layer. The catalyst layer includes a carrier on which a catalyst is supported. The same applies to the anode 3.

The carrier included in the catalyst layer of the cathode 2 is constituted by particles of an inorganic oxide. In addition to the carrier, the catalyst layer also includes particles of a highly hydrophobic substance having a higher degree of hydrophobicity than the inorganic oxide constituting the carrier. In the present invention, the "degree of hydrophobicity" refers to a numerical value serving as a yardstick of hydrophilicity/hydrophobicity, and can be measured as follows by using a powder wettability tester (WET101P from Rhesca Corporation). A highly hydrophobic substance is crushed and loosened in advance and is sifted through a sieve with 250-μm openings, and 50 mg of this highly hydrophobic substance is added to 60 ml (temperature: 25° C.) of water and stirred with stirring blades. In this state, methanol is added dropwise into the water, and the methanol aqueous solution is irradiated with a laser beam having a wavelength of 780 nm, and the transmittance is measured. As the highly hydrophobic substance gets wet, it settles down and becomes suspended; the concentration-by-volume of methanol when the transmittance reaches 80% is defined as the "degree of hydrophobicity". It is judged that, the greater this value is, the higher the level of hydrophobicity. Because the catalyst layer includes such a highly hydrophobic substance, the highly hydrophobic substance acts so as to easily dissipate water produced within the catalyst layer to the outside of the catalyst layer and effectively prevent flooding, even in cases where the catalyst layer includes a carrier constituted by particles of an inorganic oxide which has a relatively high hydrophilicity.

Further, Inventors' study results have revealed that the level of hydrophilicity/hydrophobicity of the inorganic oxide can be expressed more accurately also by the "degree of hydrophilicity" defined below, in addition to the degree of hydrophobicity defined as above. In the present invention, the "degree of hydrophilicity" refers to a numerical value serving as a yardstick of hydrophilicity, and is defined as a ratio (water vapor adsorption amount/BET specific surface area) between the water vapor adsorption amount ($cm^3/g$) and the BET specific surface area ($m^2/g$) found from nitrogen gas adsorption.

The specific surface area for calculating the aforementioned degree of hydrophilicity is generally measured by employing physical adsorption of e.g. nitrogen gas, and is measured, for example, by the BET method. The BET equation is expressed as $1/cv_1+(c-1)p/cv_1p_0$, where c and $v_1$ are constants. From this equation, it is possible to estimate the specific surface area from the intercept and slope of $p/p_0$ and the density of the adsorbate. Specific surface area measurement by the BET method can be specifically performed by using, for example, SA3100 from Bechman Coulter or Flowsorb II from Micromeritics. More specifically, $BET_{N2}$ ($m^2/g$) is measured, for example, according to the following method. Approximately 0.3 g of a measurement sample is placed in a sample cell and is pre-treated in a nitrogen atmosphere at 105° C. for 6 hours. The specific surface area of the treated sample is found according to the BET method.

The water vapor adsorption amount is found from an adsorption isotherm using water vapor as the adsorbate. More specifically, the water vapor adsorption amount can be measured by using 3ΔFlex from Micromeritics. More specifically, for example, approximately 0.2 g of a measurement sample is placed in a sample cell and is pre-treated in a vacuum at 105° C. for 6 hours. An adsorption isotherm is created for the treated sample in a 25° C. constant temperature oven while changing the water vapor partial pressure p/p0 from 0.001 to 0.9. The water vapor adsorption amount per unit mass of the sample when p/p0 is 0.9 is estimated from the obtained adsorption isotherm.

Inventors' study results have revealed that a lower hydrophilicity of the highly hydrophobic substance, i.e., a higher hydrophobicity, does not necessarily lead to the effect of preventing flooding. In contrast, study results have revealed that, in cases where a highly hydrophobic substance is included in a catalyst layer that uses, as the carrier, a carbon material which is a material having a relatively high hydrophobicity, the higher the hydrophobicity of the highly hydrophobic substance, the more preferable. So, in cases of using, as the carrier, an inorganic oxide which is a material having a relatively high hydrophilicity, it is advantageous, from the viewpoint of effectively preventing flooding, to set the level of hydrophobicity of the highly hydrophobic substance, which is to be included in the catalyst layer with the carrier, within an appropriate range. From this viewpoint, the degree of hydrophobicity of the highly hydrophobic substance is preferably from 0.5 vol % to 45 vol %, more preferably from 0.5 vol % to 39 vol %, even more preferably from 0.7 vol % to 35 vol %, and further more preferably from 1.0 vol % to 30 vol %.

On the other hand, as regards the degree of hydrophilicity, the degree of hydrophilicity of the highly hydrophobic substance is preferably from 0.002 $cm^3/m^2$ to 0.48 $cm^3/m^2$, more preferably from 0.002 $cm^3/m^2$ to 0.30 $cm^3/m^2$, even more preferably from 0.002 $cm^3/m^2$ to 0.13 $cm^3/m^2$.

The degree of hydrophobicity demanded of the highly hydrophobic substance is also related to the degree of hydrophobicity of the carrier included in the catalyst layer. The degree of hydrophobicity of the highly hydrophobic substance is higher than the degree of hydrophobicity of the carrier, as described above, and it is preferable that the degree of hydrophobicity of the highly hydrophobic substance is preferably from 0.5 vol % to 39 vol % higher, more preferably from 1.0 vol % to 30 vol % higher, than the degree of hydrophobicity of the carrier. Setting the degree of hydrophobicity of the highly hydrophobic substance within this range can prevent flooding more effectively. Herein, "the degree of hydrophobicity of the carrier" refers to the degree of hydrophobicity in a state where no catalyst is supported on the carrier.

Similarly, also regarding the degree of hydrophilicity, the degree of hydrophilicity of the highly hydrophobic substance is also related to the degree of hydrophilicity of the carrier included in the catalyst layer. It is preferable that the degree of hydrophilicity of the highly hydrophobic substance is preferably from 0.35 $cm^3/m^2$ to 0.83 $cm^3/m^2$ lower, more preferably from 0.53 $cm^3/m^2$ to 0.83 $cm^3/m^2$ lower, than the degree of hydrophilicity of the carrier. Setting the degree of hydrophilicity of the highly hydrophobic substance within this range can prevent flooding more effectively. Herein, "the degree of hydrophilicity of the carrier" refers to the degree of hydrophilicity in a state where no catalyst is supported on the carrier.

Inventors' study results have revealed that, even when a highly hydrophobic substance is included in the catalyst layer of the cathode 2, the internal resistance of the fuel cell does not change. This means that the highly hydrophobic substance does not function as an electroconductive adjuvant, but the highly hydrophobic substance contributes only to the effective prevention of flooding owing to improved gas diffusibility. In contrast, the aforementioned Patent Literature 1 describes that the inclusion of a highly hydrophobic substance in a catalyst layer using a carbon material as a carrier blocks the gas diffusion paths in the catalyst layer.

The highly hydrophobic substance is preferably selected from substances that do not affect the electrode reaction of the cathode 2. It is also preferable to select the highly hydrophobic substance from substances that are chemically stable even when the cathode 2 is exposed to high electric potential. Examples of highly hydrophobic substances include carbon powders, such as graphite carbon black (referred to hereinafter also as "GCB"), graphitized carbon, graphitized acetylene black, and acetylene black. It is preferable that the carbon powder's crystallite size Lc (002) in the c-axis direction as calculated from a (002) diffraction line (ICSD card number 00-056-0159) measured by powder X-ray diffractometry is from 1 nm to 10 nm. Particularly, as for the carbon power, it is preferable to use GCB which is an electrochemically stable substance owing to high crystallinity.

In the present invention, in place of GCB, or in addition to GCB, it is possible to use, as the highly hydrophobic substance, a powder of a later-described inorganic oxide, which is used as the carrier, whose surface is covered with a hydrophobic material. Examples of such inorganic oxides include indium-containing oxides, tin-containing oxides, titanium-containing oxides, zirconium-containing oxides, selenium-containing oxides, tungsten-containing oxides, zinc-containing oxides, vanadium-containing oxides, tantalum-containing oxides, niobium-containing oxides, and rhenium-containing oxides. More preferable examples of inorganic oxides include tin-doped indium oxide, and metal-doped or nonmetal-doped tin oxides, such as antimony-doped tin oxide, fluorine-doped tin oxide, tantalum-doped tin oxide, and niobium-doped tin oxide. Among the aforementioned inorganic oxides, it is particularly preferable to use a tin-containing oxide from the viewpoint of acid resistance and high electron conductivity. Examples of hydrophobic materials for covering the surface of the inorganic oxide powder include fluorine-containing polymer compounds. An example of the fluorine-containing polymer compound includes a tetrafluoroethylene-hexafluoropropylene (FEP) copolymer. Other examples of hydrophobic materials include silicon-containing compounds. Examples of silicon-containing compounds include alkoxysilanes, e.g. hexyltriethoxysilane and fluoroalkoxysilanes such as nonafluorohexylmethoxysilane, and silazanes such as hexamethyldisilazane.

The amount of the highly hydrophobic substance that may be included in the catalyst layer of the cathode 2 can be set over a wide range. More specifically, the proportion of the highly hydrophobic substance with respect to the total volume of the catalyst-supporting carrier and the highly hydrophobic substance is preferably from 4 vol % to 63 vol %, more preferably from 16 vol % to 63 vol %, even more preferably from 16 vol % to 39 vol %. By setting the proportion of the highly hydrophobic substance within this range, flooding can be prevented effectively, and significant occurrence of dry-up can be effectively suppressed during low-humidity operation of the fuel cell.

A catalyst may unintentionally and unavoidably exist on the surface of the highly hydrophobic substance; however, from the viewpoint of suppressing degradation of the highly hydrophobic substance, it is preferable that no catalyst is intentionally supported on the surface of the highly hydrophobic substance.

As described above, the highly hydrophobic substance has a particulate form. The primary particle diameter of the highly hydrophobic substance particles is preferably from 10 nm to 500 nm, more preferably from 10 nm to 300 nm, even more preferably from 10 nm to 100 nm. So long as the primary particle diameter is within the aforementioned range, the highly hydrophobic substance particles may exist in the catalyst layer in the form of secondary particles made by the agglomeration of primary particles. The primary particle diameter of the highly hydrophobic substance is found by: observing the cross section of the catalyst layer with an electron microscope; measuring the maximum transverse length of at least 500 particles; and calculating the average value thereof.

As described above, an inorganic oxide is used for the carrier included in the catalyst layer of the cathode 2. For the inorganic oxide, it is possible to use, for example, a metal oxide, a nonmetal oxide, or a semimetal oxide. The inorganic oxide may or may not have electron conductivity. From the viewpoint of increasing the electron conductivity of the catalyst layer of the cathode 2, it is preferable that the inorganic oxide has electron conductivity. For example, it is preferable to use an inorganic oxide having a volume resistivity of 1 MΩ cm or less. Examples of inorganic oxides include indium-based oxides, tin-based oxides, titanium-based oxides, zirconium-based oxides, selenium-based oxides, tungsten-based oxides, zinc-based oxides, vanadium-based oxides, tantalum-based oxides, niobium-based oxides, and rhenium-based oxides. More preferable examples of inorganic oxides include tin-doped indium oxide, and metal-doped or nonmetal-doped tin oxides, such as antimony-doped tin oxide, fluorine-doped tin oxide, tantalum-doped tin oxide, and niobium-doped tin oxide. In cases of using, among the aforementioned inorganic oxides, a tin oxide or a tin oxide doped with a metal such as niobium or tantalum, it is preferable to use GCB for the highly hydrophobic substance. In cases of doping a tin oxide with a metal M such as niobium or tantalum, the amount of the dopant metal M, as expressed by M (mol)/[M (mol)+Sn (mol)]×100, is preferably from 0.01 at. % to 20 at. %, more preferably from 0.1 at. % to 10 at. %.

From the viewpoint of allowing the catalyst to be supported over a large specific surface area, the primary particle diameter of the carrier is preferably from 5 nm to 200 nm, more preferably from 5 nm to 100 nm, even more preferably from 5 nm to 50 nm. The method for measuring the primary particle diameter may be the same as the method for measuring the primary particle diameter of the highly hydrophobic substance particles. The BET specific surface area of the carrier is preferably from 20 $m^2/g$ to 1500 $m^2/g$.

As for the catalyst to be supported on the carrier made of an inorganic oxide, it is possible to use any catalyst similar to those used heretofore in the present technical field, with examples including platinum, alloys of platinum and a noble metal other than platinum (such as ruthenium, rhodium, or iridium), and alloys of platinum and a base metal (such as vanadium, chromium, cobalt, nickel, iron, or titanium). From the viewpoint of exerting catalytic activity efficiently, it is preferable that the average particle diameter of the catalyst on the surface of the carrier is from 1 nanometer to several dozen nanometers.

There is no particular limitation to the method for fixing the catalyst onto the carrier surface, and it is possible to employ any method similar to those known heretofore in the present technical field. For example, when platinum is used as the catalyst, platinum can be fixed to the carrier by employing, for example, platinic chloride hexahydrate ($H_2PtCl_6 \cdot 6H_2O$) or dinitrodiamine platinum ($Pt(NH_3)_2(NO_2)_2$) as a platinum source, and reducing the same by a known method, such as liquid-phase chemical reduction, gas-phase chemical reduction, impregnation-reduction pyrolysis, a colloidal method, or surface-modified colloid pyrolysis reduction. The amount of catalyst supported is preferably from 1 mass % to 70 mass % with respect to the mass of the carrier.

In addition to the aforementioned substances, the catalyst layer of the cathode 2 may include, as necessary, materials similar to those known heretofore in the present technical field, such as an ionomer and a binder for binding particles.

The cathode 2 of the membrane-electrode assembly 10 has been described above, but the anode 3 may be configured similarly to the cathode 2. Note, however, that flooding is less likely to occur in the catalyst layer of the anode 3 than in the catalyst layer of the cathode 2, and thus, it is not essential to include the aforementioned highly hydrophobic substance in the catalyst layer of the anode 3. Also, the catalyst layer of the anode 3 is not exposed to high electric potential during the operation of the fuel cell, and thus, it is not essential to use an inorganic oxide as the catalyst carrier. Thus, it is possible to use, for example, a carbon material as the catalyst carrier.

The cathode 2 and the anode 3 can be formed by applying, on the surface of the polymer membrane 4 or the gas diffusion layer, a mixture including, for example, a catalyst-supporting carrier, a highly hydrophobic substance (in case of the cathode 2), an ionomer, and a solvent in which the ionomer can be dissolved. Any method known in the present technical field can be employed for the formation means without particular limitation. For example, it is possible to employ generally known coating means, such as screen print coating, doctor blade coating, spray coating, slit die coating, reverse coating, or bar coating.

For the polymer electrolyte membrane 4, it is possible to use a material that is chemically stable in the environment inside the fuel cell and that has high proton conductivity. Further, for the polymer electrolyte membrane 4, it is preferable to use a material that has no electron conductivity and is less likely to cause gas crossover. A preferred example of such a material is a polymer electrolyte membrane in which a sulfonic acid group is bonded to a fluoro-polyethylene main chain. Other usable examples include polysulfones, polyether sulfones, polyether ether sulfones, polyether ether ketones, and materials obtained by sulfonating a hydrocarbon-based polymer.

For the gas diffusion layer, it is preferable to use a material having electron conductivity and having a structure that is capable of diffusing, to the respective catalyst layers of the cathode 2 and the anode 3, fuel gas and oxidant through the oxidant supplying sections 20 and the fuel gas supplying sections 30. For the aforementioned material, a porous member made primarily of a carbon-containing material can be used. More specifically, it is possible to use a porous carbon material formed by carbon fibers, such as carbon paper, carbon cloth, and carbon nonwoven fabric. The aforementioned usable materials may be subjected to a surface treatment, such as a water-repellent treatment or hydrophilic treatment.

The material for the separator 5 is not particularly limited, so long as it has electron conductivity and is capable of forming oxidant supplying sections 20 and fuel gas supplying sections 30. Examples of such materials include metals such as stainless steel, carbon, and mixtures of carbon and resin.

EXAMPLES

The present invention is described in further detail below according to Examples. The scope of the present invention, however, is not limited to the following Examples. Unless particularly stated otherwise, "%" refers to "mass % (percent by mass)".

Example 1

(1) Preparation of Ink for Cathode Catalyst:

Particles of $Sn_{0.96}Nb_{0.04}O_x$ (expressed as $SnO_2$:Nb), in which $SnO_2$ was doped with 4 at. % of Nb (number of moles with respect to Sn and Nb), were used as the carrier. The carrier was produced according to the method described in WO 2009/060582, and had a structure in which a plurality of particles were connected moniliformly. When the degree of hydrophobicity of the carrier was measured according to the aforementioned method, the carrier settled down in water before methanol was added. Thus, the degree of hydrophobicity was 0. To this carrier, 7% of platinum was fixed according to the colloidal method described in JP 9-167622A. Then, 1.5 g of the platinum-supporting fine particles was placed in a container containing 3-mm-dia. zirconia beads, and predetermined amounts of water and ethanol were further added to this container, to obtain a slurry. Using a planetary ball mill, the slurry was mixed at 270 rpm for 30 minutes. Next, a 5% Nafion (registered tradename) solution (from DuPont) was added such that the volume ratio (Nafion/carrier) was 0.67, and mixing was continued at 270 rpm for 30 minutes, to form an ink.

Separate from the aforementioned operation, GCB having a specific surface area of 150 $m^2/g$ and an average particle diameter $D_{50}$ of 12.3 μm was used as the highly hydrophobic substance, and 0.063 g of the GCB was sampled in a container. Water and ethanol were poured into this container, and the mixture was subjected to ultrasonic dispersion for 30 minutes. The ink prepared according to the aforementioned method was added to the thus-obtained dispersion, and the mixture was further mixed at 270 rpm for 30 minutes, to prepare an ink for the cathode catalyst. The employed GCB's crystallite size Lc (002) in the c-axis direction as calculated from a (002) diffraction line measured by powder X-ray diffractometry was 2.95 nm, with 0.89 for the Scherrer constant.

(2) Preparation of Ink for Anode Catalyst:

A commercially available platinum-supporting carbon black (TEC10E50E from Tanaka Kikinzoku) was used as the catalyst-supporting carrier. No highly hydrophobic substance was used. Except for these points, an ink for an anode catalyst was prepared in the same way as in (1) above.

(3) Formation of Catalyst Layer:

The cathode catalyst ink and the anode catalyst ink were applied to respective surfaces of a Nafion (registered tradename) electrolyte membrane (product number NRE212 from DuPont) with a Pulse Swirl Spray device from Nordson. The amount of platinum applied was adjusted to 0.1 mg/cm$^2$ on the cathode surface and to 0.5 mg/cm$^2$ on the anode surface. The ink was pressed with a hot press at 140° C. and 10 kgf/cm$^2$ for 3 minutes. In this way, a catalyst-layer-coated electrolyte membrane (Catalyst Coated Membrane; CCM) was prepared.

(4) Preparation of Polymer Electrolyte Fuel Cell:

The thus-obtained CCM was sandwiched between a pair of gas diffusion layers (product number 25BCH from SGL Carbon). This was further sandwiched between a pair of separators consisting of carbon plates each having gas flow paths formed therein, to thereby prepare a polymer electrolyte fuel cell having the structure illustrated in FIG. 1. The thus-obtained fuel cell was equivalent to a JAM standard cell.

Example 2

Si-coated SnO$_2$:Ta particles were used instead of GCB in (1) of Example 1. SnO$_2$:Ta refers to Ta-doped SnO$_2$. SnO$_2$:Ta refers to SnO$_2$ that is doped with 2.5 at. % of Ta (number of moles with respect to Sn and Ta). SnO$_2$:Ta was produced according to the method described in WO 2014/136908. The SnO$_2$:Ta was coated with Si. The Si-coated SnO$_2$:Ta particles were produced according to the following method. In a container were placed 6 g of SnO$_2$:Ta and 3 mL of methyltrimethoxysilane (product number KBM-13 from Shin-Etsu Chemical Co., Ltd.), and the mixture was manually shaken at room temperature for 30 minutes. The obtained mixed solution was gradually heated to 120° C., and was subjected to heat condensation at 150° C. for 2 hours. In this way, particles in which the surface of SnO$_2$:Ta was coated with Si were obtained. The amount of Si coated was 16.6 mg/g-SnO$_2$:Ta.

Further, in (3) of Example 1, the amount of platinum applied to the cathode surface was 0.07 mg/cm$^2$.

Except for the above points, a polymer electrolyte fuel cell was prepared in the same way as in Example 1.

Example 3

FEP-coated SnO$_2$:Nb particles were used instead of GCB in (1) of Example 1. SnO$_2$:Nb refers to SnO$_2$ that is doped with 4 at. % of Nb (number of moles with respect to Sn and Nb). Except for this point, a polymer electrolyte fuel cell was prepared in the same way as in Example 1. FEP is a copolymer of tetrafluoroethylene and hexafluoropropylene. The FEP-coated SnO$_2$:Nb particles were produced according to the following method.

To 10 mL of pure water was added 0.177 g of an FEP dispersion (product number 120-JRB from Du Pont-Mitsui Fluorochemicals Co., Ltd.), and the mixture was stirred and mixed with a magnetic stirrer. To this dispersion was added 1.5 g of SnO$_2$:Nb particles, and the dispersion was stirred and mixed for 30 minutes. Then, the pH was adjusted to 2 by using 0.1 N nitric acid, to cause the FEP to be adsorbed onto the surface of the SnO$_2$:Nb particles. After filtering and rinsing, the residue was calcined with a tube furnace in a nitrogen atmosphere at 280° C. for 6 hours, to obtain FEP-coated SnO$_2$:Nb particles.

Example 4

Si-coated SnO$_2$:Nb particles were used instead of GCB in (1) of Example 1. SnO$_2$:Nb refers to Sn that is doped with 4.0 at. % of Nb (number of moles with respect to Sn and Nb). The SnO$_2$:Nb was coated with Si. The Si-coated SnO$_2$:Nb particles were produced according to the following method. To a mixed solution including 120 mL of ethanol and 5 mL of a 0.5 vol % acetic acid aqueous solution, 3.5 mL of hexyltriethoxysilane (product number KBM-3063 from Shin-Etsu Chemical Co., Ltd.) was added, and the mixture was stirred and mixed with a magnetic stirrer at room temperature for 60 minutes. To the obtained mixed solution was added 6 g of SnO$_2$:Nb, and the mixture was stirred and mixed with a magnetic stirrer at room temperature for 60 minutes. The solution was then filtered, and the filtered residue was gradually heated to 120° C., and was subjected to heat condensation at 150° C. for 2 hours. Then, 1.5 g of the obtained powder and 2.1 mL of hexyltriethoxysilane were placed in a container and manually shaken at room temperature for 30 minutes. The mixed solution was gradually heated to 120° C., and was subjected to heat condensation at 150° C. for 2 hours. In this way, particles in which the surface of SnO$_2$:Nb was coated with Si were obtained. The amount of Si coated was 5.1 mg/g-SnO$_2$:Nb.

Further, in (3) of Example 1, the amount of platinum applied to the cathode surface was 0.12 mg/cm$^2$.

Except for the above points, a polymer electrolyte fuel cell was prepared in the same way as in Example 1.

Comparative Example 1

SnO$_2$:Nb particles were used instead of GCB in (1) of Example 1. Except for this point, a polymer electrolyte fuel cell was prepared in the same way as in Example 1.

Comparative Example 2

No GCB was added to the catalyst layer of the cathode in Example 1. Except for this point, a fuel cell was obtained in the same way as in Example 1.

{Evaluation 1}

The degree of hydrophobicity of the highly hydrophobic substance used in the cathode catalyst layer in each of the polymer electrolyte fuel cells obtained according to the Examples and Comparative Examples was measured according to the aforementioned method. Also, the degree of hydrophilicity of SnO$_2$:Nb and GCB was measured according to the aforementioned method. The results are shown in Table 1 below.

Hydrogen gas was supplied to the anode side of each of the polymer electrolyte fuel cells obtained according to the Examples and Comparative Examples, and also, oxygen gas or air was supplied to the cathode side. The flow rate was set such that the utilization rate of the hydrogen gas was 70% and the utilization rate of oxygen was 40%. These gases were first humidified with an external humidifier and then supplied to the fuel cell. The temperature of the fuel cell was adjusted to 80° C. The humidity of the supplied gases was adjusted to a relative humidity of 100% RH. Electric power was generated with each of the fuel cells within an application current range such that the cell voltage did not fall below 0.3 V. The current density when air was used as the oxidant and the cell voltage was 0.4 V was measured. The results are shown in Table 1 below.

TABLE 1

| | Highly hydrophobic substance | | | Fuel cell |
| | Type | Proportion (vol %) | Degree of hydrophobicity (vol %) | Degree of hydrophilicity ($cm^3/m^2$) | Current density** ($A/cm^2$) |
|---|---|---|---|---|---|
| Example 1 | GCB | 16 | 2.6 | 0.025 | 0.662 |
| Example 2 | Si-coated $SnO_2$:Ta | 10 | 31.0 | — | 0.165 |
| Example 3 | FEP-coated $SnO_2$:Nb | 10 | 43.4 | — | 0.139 |
| Example 4 | Si-coated $SnO_2$:Nb | 10 | 44.0 | 0.119 | 0.135 |
| Comparative Example 1 | $SnO_2$:Nb | 10 | 0*[1] | 0.835 | 0.095 |
| Comparative Example 2 | Not added | — | — | — | 0.100 |

*[1]Immediately settled down in water before addition of methanol.
**Oxidant was air.

Examples 5 to 7

In Example 1, the amount of GCB added to the cathode catalyst layer was changed so that the proportion of GCB with respect to the total volume of Pt-supporting $SnO_2$:Nb and GCB was 4 vol % (Example 5), 39 vol % (Example 6), and 63 vol % (Example 7). Except for these points, fuel cells were obtained in the same way as in Example 1.

{Evaluation 2}

Figure 2:
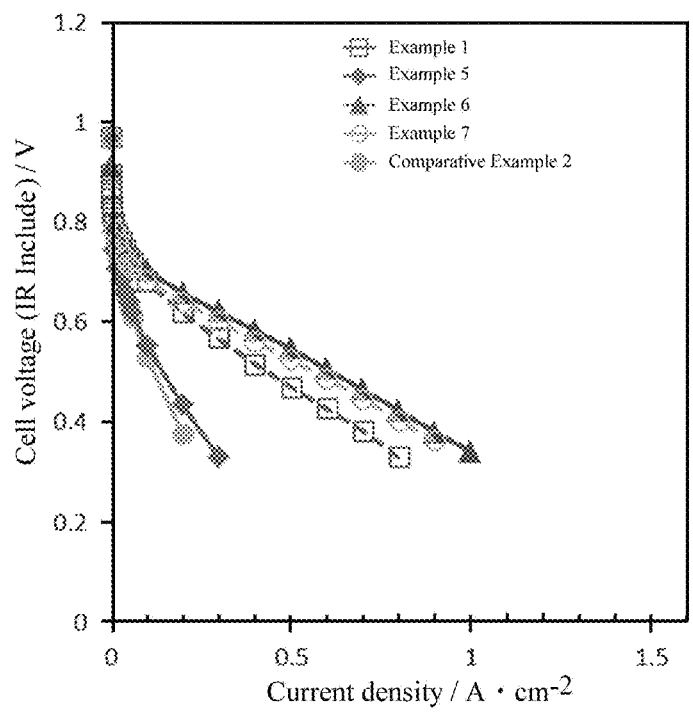
FIG. 2 is a graph illustrating the relationship between current density and cell voltage in a case where air is the oxidant in each of the polymer electrolyte fuel cells obtained in Examples 1 and 5 to 7 and Comparative Example 2.
Figure 3:
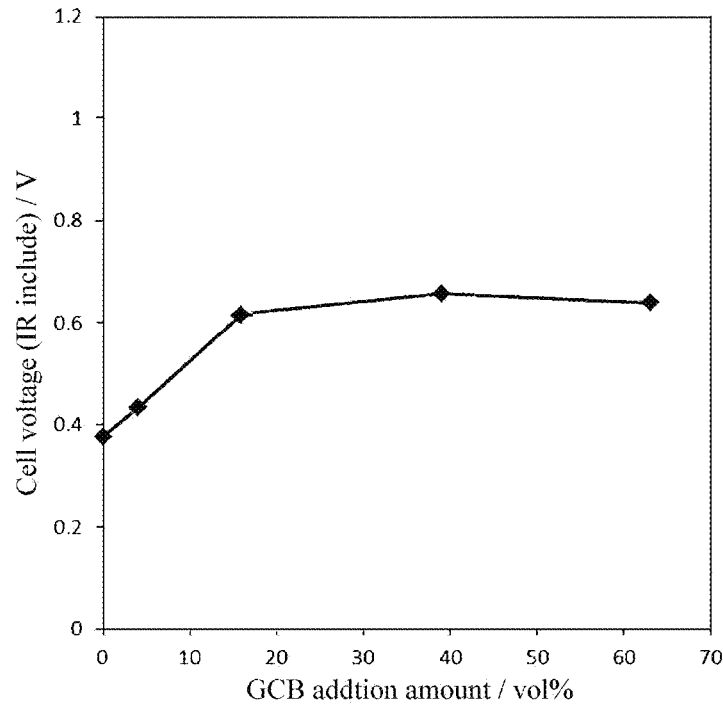
FIG. 3 is a graph illustrating the relationship between cell voltage and the amount of highly hydrophobic substance added in each of the polymer electrolyte fuel cells obtained in Examples 1 and 5 to 7 and Comparative Example 2.
Figure 4:
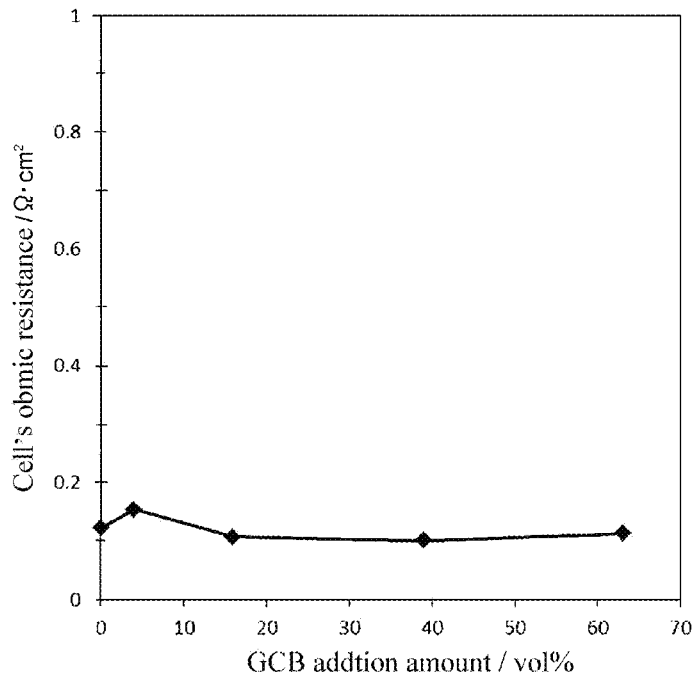
FIG. 4 is a graph illustrating the relationship between the cell's ohmic resistance and the amount of highly hydrophobic substance added in each of the polymer electrolyte fuel cells obtained in Examples 1 and 5 to 7 and Comparative Example 2.

Each of the fuel cells obtained according to Examples 1 and 5 to 7 and Comparative Example 2 was operated under the same conditions as in the aforementioned Evaluation 1, and the relationship between cell voltage and current density was obtained for when the oxidant was air. The results are shown in FIG. 2. Further, based on the relationship between cell voltage and current density, the relationships between the amount of GCB added and the cell voltage, the cell's ohmic resistance, and $O_2$ gain were obtained for when the current density was 0.2 $A/cm^2$. The results are shown in FIGS. 3 to 5. "$O_2$ gain" is the difference in cell voltage between a case where oxygen is used as the oxidant and a case where air is used as the oxidant when electric power is generated at an oxygen utilization rate of 40%. Here, the cell voltage is the voltage after subtracting the voltage drop caused by the internal resistance (alternating-current resistance at a frequency of 10 kHz) within the fuel cell. $O_2$ gain is an index expressing the diffusibility of oxygen; in the present invention, it can be judged that, the smaller this value, the further flooding was reduced.

The results shown in Table 1 and FIG. 2 clearly show that the fuel cells of Examples 1 and 5 to 7 achieve higher current densities than the fuel cells of the Comparative Examples. FIG. 3 shows that the cell voltage becomes substantially constant when the GCB addition amount is 16 vol % or higher. The results of FIG. 4 clearly show that there is no substantial change in the cell's ohmic resistance of the fuel cell even when the GCB addition amount is changed. Further, the results of FIG. 5 clearly show that, in contrast to Comparative Example 2 including no GCB, $O_2$ gain drops sharply by adding 4 vol % or more GCB.

INDUSTRIAL APPLICABILITY

As described in detail above, the present invention provides a membrane-electrode assembly in which flooding is effectively prevented without impairing the various characteristics of a fuel cell, and a polymer electrolyte fuel cell using the membrane-electrode assembly.

The invention claimed is:

1. A membrane-electrode assembly comprising a catalyst layer that includes (i) a catalyst-supporting carrier comprising a catalyst supported on a carrier made of an inorganic oxide and (ii) a hydrophobic substance having a higher degree of hydrophobicity than the inorganic oxide,
   the catalyst layer being formed on at least one surface of a polymer electrolyte membrane, and
   wherein the carrier of the catalyst-supporting carrier is made of a tin oxide doped, or not doped, with a metal, and
   wherein a degree of hydrophobicity of the hydrophobic substance is from 0.5 vol % to 35 vol % at 25° C., the degree of hydrophobicity being defined as a concentration of methanol (vol %) when a light transmittance of a dispersion obtained by dispersing the hydrophobic substance in a mixed solution of water and methanol reaches 80%,
   wherein the hydrophobic substance consists of a metal-doped or nonmetal-doped tin oxide covered with a fluorine-containing polymer compound or a silicon-containing compound.

2. The membrane-electrode assembly according to claim 1, wherein a water vapor adsorption amount/BET specific surface area value which is the ratio between a water vapor adsorption amount ($cm^3/g$) of the hydrophobic substance and a BET specific surface area ($m^2/g$) measured by using nitrogen is from 0.002 $cm^3/m^2$ to 0.48 $cm^3/m^2$.

3. The membrane-electrode assembly according to claim 1, wherein a proportion of the hydrophobic substance with respect to the total volume of the catalyst-supporting carrier and the hydrophobic substance is from 4 vol % to 63 vol %.

4. The membrane-electrode assembly according to claim 1, wherein the hydrophobic substance comprises graphite carbon black, graphitized carbon, graphitized acetylene black, or acetylene black.

5. The membrane-electrode assembly according to claim 1, wherein the hydrophobic substance comprises an inorganic oxide powder whose surface is covered with a hydrophobic material.

6. The membrane-electrode assembly according to claim 5, wherein the inorganic oxide powder includes a metal-doped or nonmetal-doped tin oxide, and the hydrophobic material includes a silicon-containing compound.

7. The membrane-electrode assembly according to claim 5, wherein the metal-doped tin oxide is Ta-doped tin oxide or Nb-doped tin oxide.

8. The membrane-electrode assembly according to claim 5, wherein the inorganic oxide powder includes a metal-doped or nonmetal-doped tin oxide, and the hydrophobic material includes a fluorine-containing polymer compound.

9. A polymer electrolyte fuel cell comprising the membrane-electrode assembly according to claim 1, wherein the catalyst layer is employed as a cathode catalyst layer.

* * * * *